United States Patent [19]

De Luca et al.

[11] 4,313,039
[45] Jan. 26, 1982

[54] TELEPHONE MODULAR DISTRIBUTING FRAME

[75] Inventors: Paul V. De Luca, Plandome Manor; David Rawlings, Bayville, both of N.Y.

[73] Assignee: Porta Systems Corp., Syosset, N.Y.

[21] Appl. No.: 151,420

[22] Filed: May 19, 1980

[51] Int. Cl.³ .............................................. H04Q 1/16
[52] U.S. Cl. ...................................................... 179/98
[58] Field of Search .................... 179/98, 91 R, 1 PC; 361/421, 425–429; 339/18 R, 18 C

[56] References Cited

U.S. PATENT DOCUMENTS

| | | | |
|---|---|---|---|
| 3,780,351 | 12/1973 | Salmon | 179/98 |
| 4,002,856 | 1/1977 | Sedlacek et al. | 179/98 |
| 4,117,273 | 9/1978 | Gaurien et al. | 179/98 |
| 4,204,095 | 5/1980 | De Luca et al. | 179/98 |
| 4,217,023 | 8/1980 | Petit et al. | 179/98 |

Primary Examiner—Gerald L. Brigance
Attorney, Agent, or Firm—Charles E. Temko

[57] ABSTRACT

A modular telephone distributing frame particularly suited for rapid installation. The frame includes a plurality of framework groups that are mounted end to end in one or more lines to construct a frame of desired ultimate capacity. Each framework group consists of three separate assemblies, including a protector frame assembly for terminating outside cable pairs, a line equipment frame assembly for terminating line equipment and associated equipment appearances, and a vertical channel assembly used to connect the protector frame assembly and the line equipment frame assembly. Connector blocks and terminal blocks are prewired together, and are installed on the frame by passing one of the blocks through from one side to the other prior to mounting on the opposite side of the frame.

2 Claims, 5 Drawing Figures

4,313,039

TELEPHONE MODULAR DISTRIBUTING FRAME

BACKGROUND OF THE INVENTION

This invention relates generally to the field of telephony, and more particularly to an improved modular distributing frame of a type usually installed in a telephone office. Devices of this general type are known in the art, and the invention lies in specific constructional details which permit ease of manufacture, installation and expansion to accommodate additional circuits when required.

Telephone main frames are used to terminate individual subscriber cable pairs at a convenient location for connection to office equipment for switching or other processing. By terminating the subscriber pairs for appearance at a predetermined area, it is possible to provide for the incorporation of protecting devices in series with the cable pairs, and provide for the testing of circuits for various defects. In the early years of telephony, the number of such subscriber pairs was limited, and space limitations generous. With burgeoning demand, the need for compact construction is ever present, and numerous attempts have been made to design equipment which will require minimum space allocation per cable pair. Most frames feature a skeletonized frame adapted to support various types of connector blocks which provide the appearances for the cable pairs, together with accompanying blocks for the termination of conductors leading to inside plant equipment. Shunt jumpers are used to interconnect the two and more or less space utilization is made depending upon the effectiveness of frame geometry. Blocks must be positioned upon the frame with a view toward obtaining adequate accessibility to personnel, both during initial installation and during subsequent servicing operations. This has resulted in a wide variety of connector block configurations, each offering certain advantages. However, maximum space utilization remains with the use of a traditional two-sided frame. The principal disadvantage of this frame is the necessity of wiring protector blocks on one side of the frame to connector blocks on an opposite side of the frame. Another difficulty lies in the complexity of cable connection at the time of initial installation.

SUMMARY OF THE INVENTION

Briefly stated, the invention contemplates the provision of an improved modular distributing frame of the class described in which the above mentioned disadvantages have been substantially eliminated. The disclosed embodiment is comprised of framework groups that are mounted end to end in one or more planes to form a completed frame structure of desired capacity. There are three separate assemblies comprising the frame, including a protector frame assembly which supports protector blocks mounted in mutually coplanar relation facing in a first direction. In spaced parallel relation is a line equipment frame assembly supporting corresponding connector blocks for line equipment and associated equipment appearances. A vertical channel assembly interconnects the protector block assembly and the line equipment frame assembly, and provides means for conducting requisite jumpers between appearance locations.

The protector frame assembly has two working sides. It supports a plurality of connector block assemblies, each including a connector block prewired to a terminal block. The connector block is also provided with specified lengths of stub cable which can enter the frame from either above or below. During installation, the terminal blocks are "fed through" the plane of the frame, and are mounted opposite the respective protector blocks on a second side of the frame.

BRIEF DESCRIPTION OF THE DRAWINGS

In the drawings to which reference will be made in the specification, similar reference characters have been employed to designate corresponding parts throughout the several views.

DETAILED DESCRIPTION OF THE DISCLOSED EMBODIMENT

Figure 1:
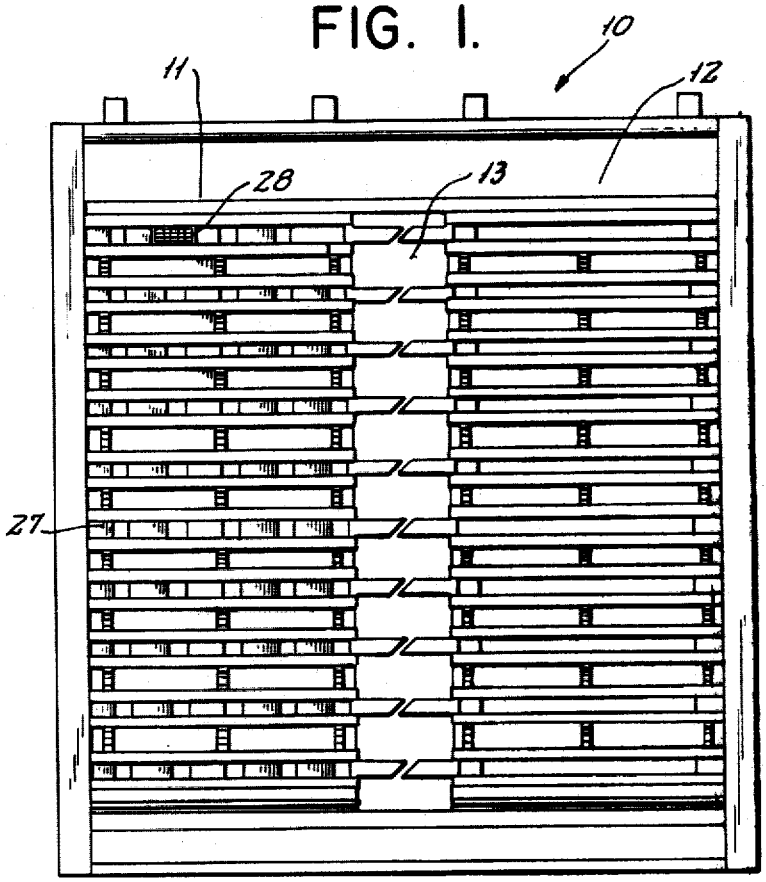
FIG. 1 is a front elevational view of an embodiment of the invention.
Figure 2:
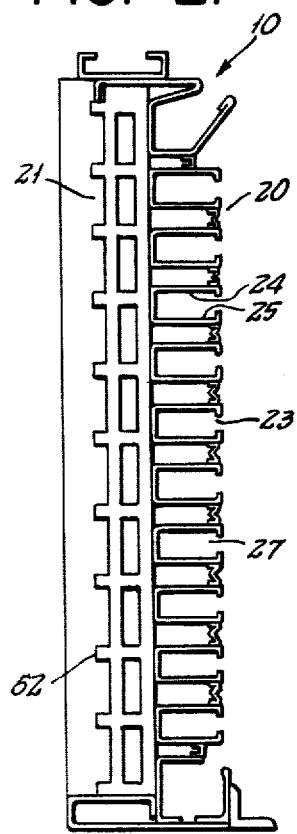
FIG. 2 is a side elevational view thereof.

Before entering into a detailed description of the disclosed embodiment, a review of the prior art is considered apposite.

In the interconnection of individual subscriber circuits which pass into a telephone office through a subterranean vault, it is common practice to provide a double-sided distributing frame. The ends of the subscriber pairs are connected to a stub cable which leads from the cable vault to the floor of the telephone office building upon which the frame is mounted, passing in the process through openings in floors to reach the proper level. One side of the double frame carries mounted terminal blocks, which provide appearances for the subscriber pairs which are interconnected by jumpers to corresponding appearances for the office equipment. The other side of the frame carries corresponding connector blocks to which the ends of the stub cable are attached. The circuits on the protector block are completed by passing them through individual protector modules prior to providing an appearance on the inner surface of the protector block, this appearance being connected to a corresponding inwardly disposed appearance on the terminal blocks. In the prior art, blocks on one side are installed, conductors are run from one of the pairs of blocks to the corresponding block on the other side of the frame. This is done by attaching connectorized leads to each block, and when assembly is complete, the two halves of the connectors are snapped together. A stub cable is also attached to the protector block which leads to the vault where connection with the subscriber pairs is accomplished. This installation is performed on the frame, and requires as much as an hour per pair of blocks in termination time alone. Additional time is also required for cabling across the aisle to office equipment and dressing and forming within the frame. The added expense of connectorizing the leads between pairs of blocks is substantial, but is required because of the complexity of cable routing.

In accordance with the present invention, much of this operation is performed at the time of manufacture, and the frame is provided with plural horizontal axis openings extending between the two sides of the frame. Connector block assemblies including prewired terminal block, protector block and stub cable are manufactured as individual units, and at the situs of installation, one or the other of the protector end terminal blocks is passed through the openings to permit one block to be mounted on one side of the frame, and the other to be mounted on the other side of the frame. The previously attached stub cable is then led down an adjacent vertical channel in the frame to the cable vault, passing, where necessary, through one or more floors of the office.

With the foregoing in mind, reference may now be made to the accompanying drawings. The device, generally indicated by reference character 10, comprises broadly a protector frame assembly 11, a line equipment frame assembly 12, a vertical channel assembly 13, and a plurality of individual connector block assemblies.

The protector frame assembly 11 interconnects with incoming subscriber pairs emanating from the cable vault (not shown), and includes a front side 20 and a rear side 21.

The front side 20 includes a plurality of hollow box-like mounting members 23, each including an upper wall 24 and a lower wall 25 upon which individual terminal blocks may be mounted. The walls 24–25 define horizontal interstices 27 along which individual jumpers (not shown) are oriented.

The rear side 21 includes a protector section 32 and a line equipment section 33. The protector section 32 includes a plurality of vertical channel forming members 34, upon which protector blocks 35 are mounted in generally vertical orientation. The blocks, in turn, mount protector modules 36 in well known manner.

On the line equipment section 33 there are provided a plurality of horizontal troughs 40 in which conductors (not shown) are provided to lead to the vertical channel assembly 13.

Figure 3:
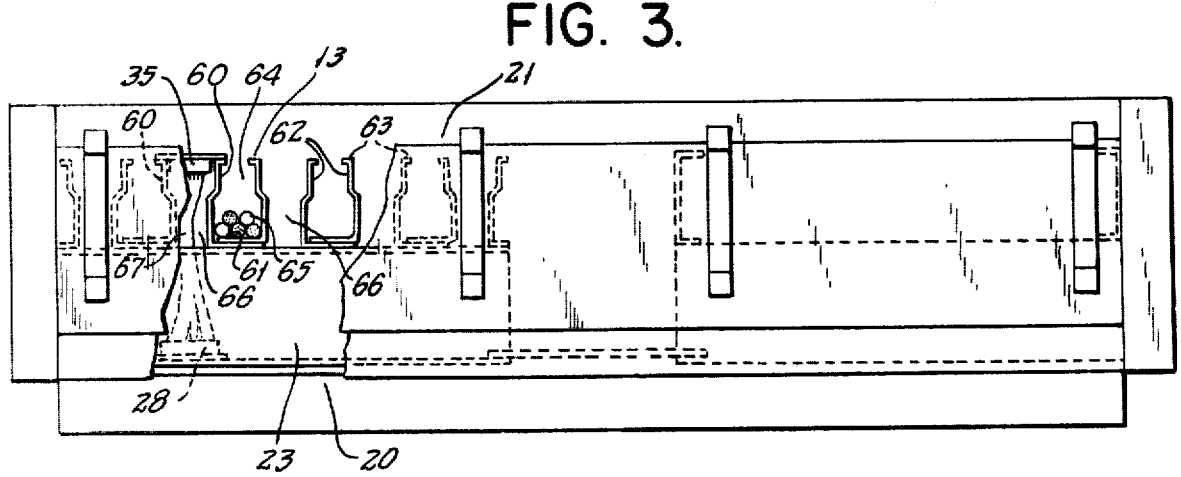
FIG. 3 is a top plan view thereof.
Figure 4:
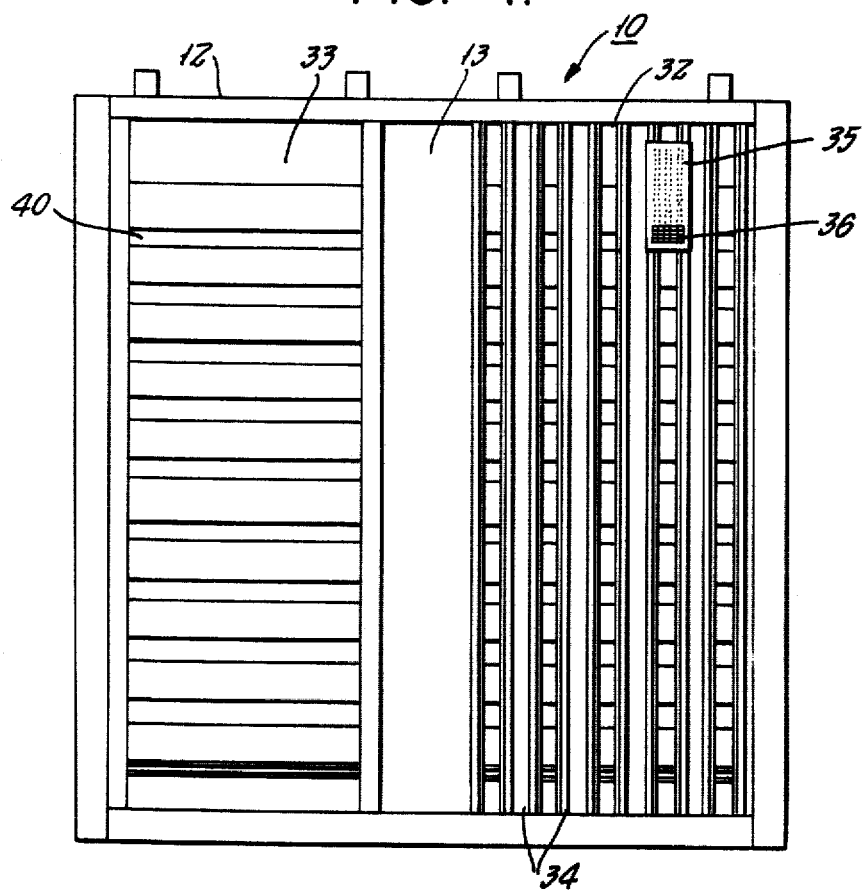
FIG. 4 is a rear elevational view thereof.

The support structure for the entry of cables from the cable vault of the building in which the frame is installed is best understood from a consideration of FIGS. 3 and 4. It includes a plurality of generally U-shaped members 60, each including a base 61 supported from horizontal structure defining the troughs 40, and a pair of laterally extending members 62, each terminating in offset portions 63. By spacing the U-shaped members 60 at substantially equal periodic intervals, there are provided a first recess 64 accommodating cables 65 leading to the cable vault, and a second recess 66 partially bounded by the inner surface of an individual protector block 35 in which individual cable pairs 67 extend to interconnect with corresponding inwardly facing terminals on the terminal blocks on the front side 20 of the frame.

The vertical channel assembly 13 is best illustrated in FIGS. 1, 3 and 4. It includes a vertically disposed plate 68 interconnecting the assemblies 11 and 12, and defining vertical passageways 69a and 69b bordered by conductor retainers 70a which is disposed forwardly of the plate 68 and conductor retainers 70b which are disposed rearwardly thereof. The forward passageway communicates with horizontally oriented express troughs 70c and 70d.

Figure 5:
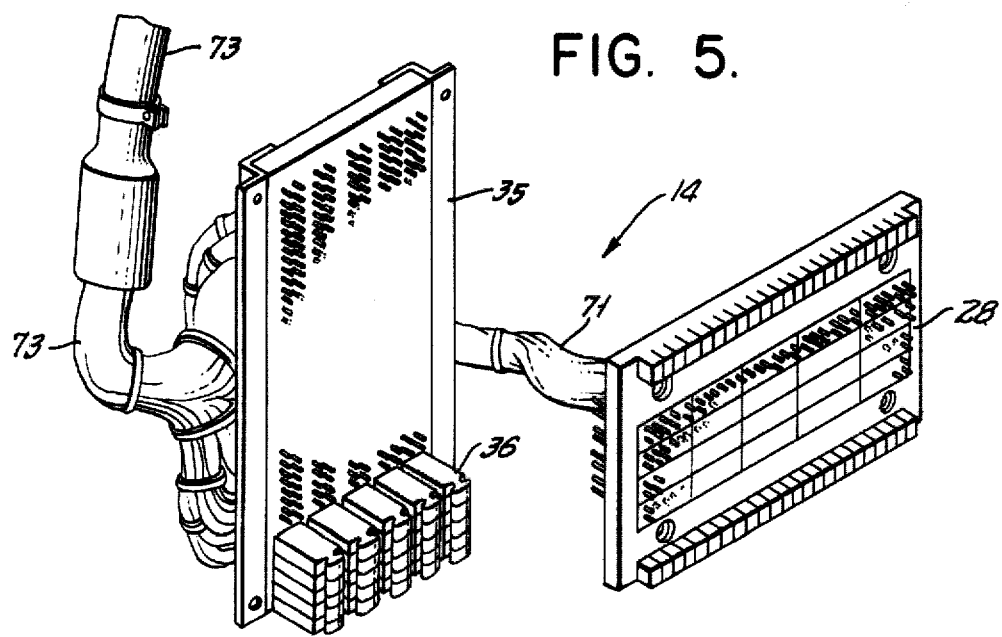
FIG. 5 is a view in perspective showing a prewired connector block assembly, comprising a part of the disclosed embodiment.

The connector block assemblies 14, as has been mentioned, are completely assembled at the time of manufacture, and as seen in FIG. 5, each assembly includes an individual terminal block 28 and protector block 35. A short length of cable 71 includes conductors (not shown) which are wire wrapped to corresponding pins on the blocks 28 and 35. A stub cable 73 is similarly interconnected at the time of manufacture at one end thereof, leaving the other end free to be interconnected to subscriber pairs in a cable vault.

From a consideration of the above, it will be apparent that installation of the device 10 is materially simplified, as contrasted with prior art constructions. The assemblies 11–13, inclusive, are positioned in situ, wherein the front side 20 defines a plurality of elongated horizontally oriented openings through which the connector blocks 28 may be passed to be screwed in position on the front side of the protector frame assembly 11. Without resorting to any wiring within the protector frame assembly, the blocks 35 are then positioned on the rear side 31 of the protector section 32. The stub cables 73 may then be threaded to the cable vault, for interconnection with incoming subscriber lines. It will be observed that by providing factory assembled connector block assemblies for the protector section of the frame, the on site wire wrapping of conductors extending between the connector block and the protector block of each assembly is eliminated, together with the necessity of connectorizing the free ends of leads coming from each block for subsequent interconnection to complete the circuits.

The line equipment section 33 may then be subsequently wired in normal manner. Because only one set of blocks is normally required for installing the line equipment section, this phase of the installation is traditionally accomplished without difficulty.

It may thus be seen that we have invented novel and highly useful improvements in distributor frame construction, in which, owing to the provision of preassembled protector block assemblies for the protector side of the frame, the installation of the same proceeds with minimal difficulty. In prior art constructions, often an installation time of one hour per set of connector-protector blocks is required for each one hundred pairs. This time is completely eliminated, together with the cost of installing connectors which are subsequently mated when wire wrapping operations on each side of the frame are completed.

We wish it to be understood that we do not consider the invention limited to the precise details of structure shown and set forth in this specification, for obvious modifications will occur to those skilled in the art to which the invention pertains.

We claim:

1. As a new article of manufacture, a prewired connector block module for use with a double-sided telephone distributing frame comprising:

a generally rectangular terminal block having a first surface including a plurality of pairs of mounting pins projecting therefrom, and a second surface through which oppositely disposed segments of said pairs of pins project;

a length of cable having a number of conductors therein corresponding to the number of said pins, said conductors being connected to individual oppositely disposed segments of said pins;

a generally rectangular connector block having provision for mounting protector modules, and interconnecting the opposite ends of conductors of said cable; and a stub cable of predetermined length having conductors therein, first ends of which are connected to said connector block, and second ends of which are free of interconnection.

2. The method of interconnecting individual subscriber cable pairs to office equipment comprising the steps of:
providing a two-sided distributing frame having means for mounting terminal blocks on a first side thereof and protector blocks on a second side thereof, said frame being of generally skeletonized construction, and defining plural openings passing in a horizontal plane between said first and second sides;
providing a plurality of prewired connector block assemblies, each including a generally rectangular terminal block having a first surface including a plurality of projecting pairs of mounting pins, and a second surface through which oppositely disposed segments of said pairs of pins project, a length of cable having a number of conductors therein corresponding in number to said pairs of pins, said conductors being connected to individual oppositely disposed segments of said pins, a generally rectangular connector block having provision for mounting modules, and pins interconnecting the opposite ends of conductors of said cable, and a cable stub of predetermined length having conductors therein, first ends of which are connected to said connector block, and second ends of which are free of interconnection;
individually installing said connector block assemblies on said frame by passing one of said connector and terminal blocks through one of said openings, and mounting said one of said blocks on one side of said frame;
mounting the other of said terminal and connector blocks on the other side of said frame; and
interconnecting the free ends of conductors of said stub cables to incoming subscriber cable pairs.

* * * * *